(12) United States Patent
Pürstinger

(10) Patent No.: US 6,296,464 B1
(45) Date of Patent: Oct. 2, 2001

(54) CALIBRATING DEVICE WITH AT LEAST ONE CALIBRATING DIE

(75) Inventor: Franz Pürstinger, Traun (AT)

(73) Assignee: C. A. Greiner & Söhne Gesellschaft m.b.H., Kremsmünster (AT)

( * ) Notice: Subject to any disclaimer, the term of this patent is extended or adjusted under 35 U.S.C. 154(b) by 0 days.

(21) Appl. No.: 09/293,712

(22) Filed: Apr. 16, 1999

(30) Foreign Application Priority Data

Apr. 27, 1998 (AT) ........................................ 700/98

(51) Int. Cl.⁷ .................................................. B29C 47/90
(52) U.S. Cl. ...................... 425/72.1; 425/186; 425/326.1; 425/388; 264/209.5
(58) Field of Search .................... 425/72.1, 186, 425/326.1, 383, 388; 264/209.3, 209.4, 209.5

(56) References Cited

U.S. PATENT DOCUMENTS

| | | | |
|---|---|---|---|
| 4,029,452 | * 6/1977 | Schippers et al. | 425/71 |
| 4,913,863 | * 4/1990 | Burrafato et al. | 264/40.6 |
| 5,514,325 | * 5/1996 | Purstinger | 264/560 |
| 5,607,638 | 3/1997 | Cadwell | 264/560 |
| 5,630,982 | 5/1997 | Boring | 264/407 |

FOREIGN PATENT DOCUMENTS

| | | |
|---|---|---|
| 2239746 | 8/1972 | (DE) . |
| 29716343 | 1/1997 | (DE) . |

OTHER PUBLICATIONS

Webster's New Collegiate Dictionary, 9th Edition. Merriam Webster, Inc., 1985, p. 56.*
Article by Walter Michaeli, titled "Extrusionswerkzeuge für Kunststoffe und Kautschuk", 1991, pp. 321–329, Published by: Carl Hauser Verlag, Munich/Vienna.

* cited by examiner

Primary Examiner—Nam Nguyen
Assistant Examiner—Donald Heckenberg
(74) Attorney, Agent, or Firm—Collard & Roe, P.C.

(57) ABSTRACT

The invention relates to a calibrating device with at least one calibrating die (24), which has die faces (66) against which an extruded object fed therethrough is applied, in particular a section having several cavities, a sealing device (60, 62) being provided to seal off a gap (56) in order to form a cavity (59) and, having been formed, this cavity (59) is evacuated to a negative pressure lower than the ambient pressure, means being provided to form the gap (56) before the first end face (53) of the calibrating die (24) and at least one of the terminal edges (67) of the die faces (66) having part end faces (76) to form the gap (56) with a gap width (65) smaller than 1.0 mm.

22 Claims, 9 Drawing Sheets

CALIBRATING DEVICE WITH AT LEAST ONE CALIBRATING DIE

BACKGROUND OF THE INVENTION

1. Field of the Invention

The invention relates to an extrusion system with a moulding device, which has die faces against which an extruded object to be fed therethrough is applied, in particular a section having several cavities, which can be arranged after an extrusion and/or another calibrating die in the direction of extrusion, and has a first end face of the calibrating die forming a gap to an extrusion die and/or calibrating die which can be arranged before it in the direction of extrusion and provided with a sealing device to seal off this gap and form a cavity and all terminal edges of the die faces of the calibrating die are arranged in the region of the end face enclosed by the sealing device, wherein the pressure in this cavity, once formed, can be evacuated to a negative pressure below the ambient pressure.

2. The Prior Art

A moulding device for an extrusion system is known from DE 297 16 343 U1 of the same applicant, which has at least one calibrating device comprising in particular several calibrating dies arranged one after another in the direction of extrusion, this calibrating device and/or the calibrating dies being provided with cooling passages through which a tempering medium flows. In addition, the calibrating device has die faces against which the item being fed through is applied as well as a device to form a cavity and provide a seal between the region of the external surface of the item to be fed through and the surrounding pressure which is arranged at least between the extrusion die of the moulding device, which may be a nozzle for example, and the first calibrating die immediately thereafter. However, this sealing device for forming an additional cavity may also be arranged between the first calibrating die and at least one other calibrating die. In the case of this moulding device, the gap between the extrusion die and the first calibrating die is between 1 mm and 15 mm, preferably 3 mm to 6 mm, but this embodiment has not proved to be capable of producing satisfactory calibration results in all applications, particularly with regard to surface properties and mechanical specifications.

Other moulding devices are known in which the plastic strands of sections fed out from an extrusion nozzle, in particular hollow sections or pipes, are calibrated to desired external and internal dimensions and frozen to the desired external dimensions or cooled to the appropriate temperature that will produce the requisite natural rigidity. Moulding devices of this type are known from the book by Walter Michaeli "Extrusionswerkzeuge für Kunststoffe und Kautschuk" published by Carl Hanser Verlag, Munich/Vienna, $2^{nd}$ fully revised and extended edition, in 1991, particularly pages 321 to 329. Page 323 illustrates an external calibration system using a vacuum, in which the extruded material discharged from the extrusion die in the form of a hollow section is fed, at a certain distance after emerging from the nozzle lip of the extrusion die, into a calibrating die, through which the extruded material is fed so that the region of its circumferential external surface lies against the die faces of the calibration tool. The surface of the extruded material lies against the individual die faces of the calibrating die without any clearance, this being achieved by means of air vents, in particular slits, provided in the die faces, which are connected to a vacuum source by means of supply lines. In order to cool the extruded material, the calibrating dies are provided with one or more surrounding passages for a tempering medium and the vacuum in the individual air vents or slits can be increased at an increasing distance from the nozzle lip of the extrusion die. The temperature of the tempering medium is very low as compared with the mass temperature of the extruded section and is approximately 20° C. One or more cooling baths are generally provided adjoining these so-called dry calibrators, in which the sections, being of the requisite rigidity, are cooled to room temperature, partly by applying a vacuum and wetting from spray nozzles or by feeding them through water baths. In many instances, calibrating dies of this type are not capable of producing an adequate surface quality in the resultant extruded objects once the die has been in service for a longer period of time.

Another device for calibrating extrusion moulded sections, in particular extrusion moulded hollow sections, made from thermoplastic materials is known from DE 22 39 746 A, in which a vacuum calibrating device with an integrated cooler is arranged at a distance apart in the direction of extrusion after the extrusion die or spray head of the screw press charging the plastic material. A vacuum calibration tank through which a coolant flows is provided, connected to the vacuum calibrating device and the vacuum calibrating device is so designed that only the outer skin and optionally any external profiled sections are moulded to their final shape in it, along with any fine contours of the section to be calibrated. The residual warmth still prevailing in the section is fed away by the coolant in the vacuum calibration tank. Arranged at a distance from one another in the vacuum calibrating device are individual calibrating orifices, forming cavities between them in the form of vacuum slits, through which the extruded object is drawn against the die faces of the individual calibrating orifices due to the vacuum applied. Using the calibrating device proposed here, it has not always proved possible to produce an extruded item with perfect surface quality for all applications, nor has the device proved efficient over a longer period of service.

SUMMARY OF THE INVENTION

The underlying objective of the present invention is to produce perfect, constant surface quality at high throughput rates, in particular a high-grade gloss, whilst improving the mechanical values of the extruded item produced, particularly for window sections or pipes or similar, whilst at the same time reducing the technical expense of the machinery.

This objective of the invention is achieved by means, which are provided for forming the gap before the first end face of the calibrating die and at least one of the terminal edges of the die faces has part-end faces for forming the gap which is of a gap width smaller than 1.0 mm. The surprising advantage of this solution resides in the fact that by reducing the distance of the gap between the extrusion die and the calibrating die to less than 1.0 mm, the requisite balance between the velocities of the individual part-flows of the ejected item can be more efficiently controlled because of the differing effects of compression generated by the back-pressure built up by the calibrating die and the manner in which the section is drawn through the drawing device as a result. Furthermore, the material is more efficiently distributed between those profiled sections which are of a solid design and the profiled sections designed with hollow sections, and evenly as viewed across the cross-section of the section. As a result of the back-pressure or back-compression of the material which is created, the material is supplied at a constant rate sufficient to ensure that the solid profiled sections are completely filled during the calibration procedure and at the same time a more even profiling rate is produced across the cross-section of the item in the area of the hollow sections. Due to this layout of arranging one system immediately after the other, the equipment previously needed inside the extrusion die for metering the plastic material discharged therefrom can be largely or completely dispensed with, which means that a less expensive system is required for setting up the die to produce solid profiled sections made to specific dimensions for functional and connection purposes. The back-up effect produced by this immediately adjacent arrangement due to the small gap distance causes a back-up in the direction of the nozzle, with the result that the plastic material needed to produce the geometry of the section is metered automatically and independently in the transfer region. Another advantage resides in the fact that the result of the extrusion process is virtually independent of the various additives admixed with the plastic materials, nor is it affected by fluctuations in the mixing ratio from one charge to the next. In addition, once they have been set up, the moulding devices can be used in conjunction with different extruders or types of extruder. Moreover, it is easier to maintain the shrinkage behaviour of the extruded object because the fact that the compression varies by region means that the drawing force needed does not stretch the section to an excessive degree. Another advantage of the solution proposed by the invention resides in the fact that the requisite gloss quality can be obtained regardless of the fillers used, in particular the added chalk.

Further advantages reside in the fact that the plastic material discharged is prevented from adhering to the die plates of the calibrating die due to rapid cooling, so that there are no variances in velocity within the cross-section of the section as it enters the calibrating die. Above all, this determines the mechanical properties of the section, producing high dimensional stability and lack of tension across the cross-section and longitudinal extension of the section.

Another advantage is that the layout of passages produces even cooling, even if there are several projections or recesses, but above all the mass of plasticised plastic material is evenly distributed across the entire circumference, particularly in the region of the external faces and external walls and of the solid profiled sections.

Other embodiments make it possible to achieve uniform cooling, adapted to suit the volume of plasticised plastic, across the external circumference and the entire cross-section of the item. For this purpose, it has proved to be of advantage to use a fluid such as oil or water as the cooling medium or alternatively media which exhibit a very high heat absorption capacity, such as cryogenic gases or similar. Clearly, there is also an advantage to be had from using ambient air in pre-cooled or non-cooled from, which will produce even cooling in the calibrating device.

It is also of advantage, if the moulding device comprises at least one calibrating die and/or extrusion die.

Another advantageous embodiment produces objects with smooth, wave-free surfaces and do so with an even application of tension across sections of the most varied of cross-section or having differing intersecting planes through the section. The balance of tension in conjunction with the flat surfacing of the sections means that the strength of the objects produced can be increased, making them suitable for applications in the field of window sections, door sections or similar, or as cladding for facades that will be subjected to high temperatures, for example. However, the surprising advantage of the individual solutions also resides in the fact that the features and characteristics described can be used in any random combination to produce a high surface gloss on the objects or sections. The high gloss also increases the reflection of incident heat rays, thereby providing additional strength and enabling use in regions susceptible to high temperatures.

Consequently, the inherent porosity of the surfaces is reduced, thereby reducing penetration by moisture and producing, amongst other things, a lower heat throughput than would be possible with a higher K-factor. The service life is also lengthened as a result of the fact that blooming or cracking is avoided in the surface region. Dirt is also largely reduced or prevented from getting into the surface of the object, making cleaning of the surface significantly easier.

A particular advantage resides in the fact that the layout of the different flow resistances in the region of the external walls of the objects or solid profiled sections can be countered without the need for the adjustments that have been needed in the past whilst the extrusion dies and calibration devices are operating, i.e. without the need for conducting a series of tests to balance the distribution velocity of the through-flowing plasticised masses of plastic. This means that tools of this type can be used to produce a more constant output quality of finished objects in a shorter time, leading to cost savings.

Irrespective of this, the objective of the invention can be also achieved by a method of calibrating and cooling a long, in particular continuously extruded object made from plastic, whereby the external surface of the softened plastic of the object is subjected to a pressure below the outside ambient pressure immediately after it leaves an extrusion die and the external surface of the object is then further cooled in the inlet region to a calibrating die so as to prevent the external surface from adhering to die walls of the calibrating die. The advantages reside in the fact that a back-up or damming effect which varies by region can be applied to the emerging object on the one hand by arranging the calibrating die immediately adjacent to the extrusion die and, on the other hand, due to rapid cooling in the region of the mould surfaces at the input, which means that the external surface layers of the object can be cooled so quickly that any adhesion and sliding of individual surface layers against one another is therefore prevented. This process of producing a back-up effect in the material as it is discharged additionally reduces differences in velocity and provides a balancing effect thereof within the section cross-section, which, in conjunction with the drawing force applied to the object in a longitudinal direction thereof, also ensures that excessive stretching is prevented and hence any internal tensions that would otherwise occur.

The different stretching and compression effects in the still partially plasticised plastic material used to make the object not only reduces the proportion of shrinkage but also builds up opposing tensions in the section as the regions cool off in succession over different periods of time so that when the section is finally cooled, these tensions are mutually compensated, producing finished items after a short delay.

BRIEF DESCRIPTION OF THE DRAWINGS

The invention is described in more detail below with reference to the embodiments illustrated in the appended drawings.

Of these.

DETAILED DESCRIPTION OF PREFERRED EMBODIMENTS

Figure 1:
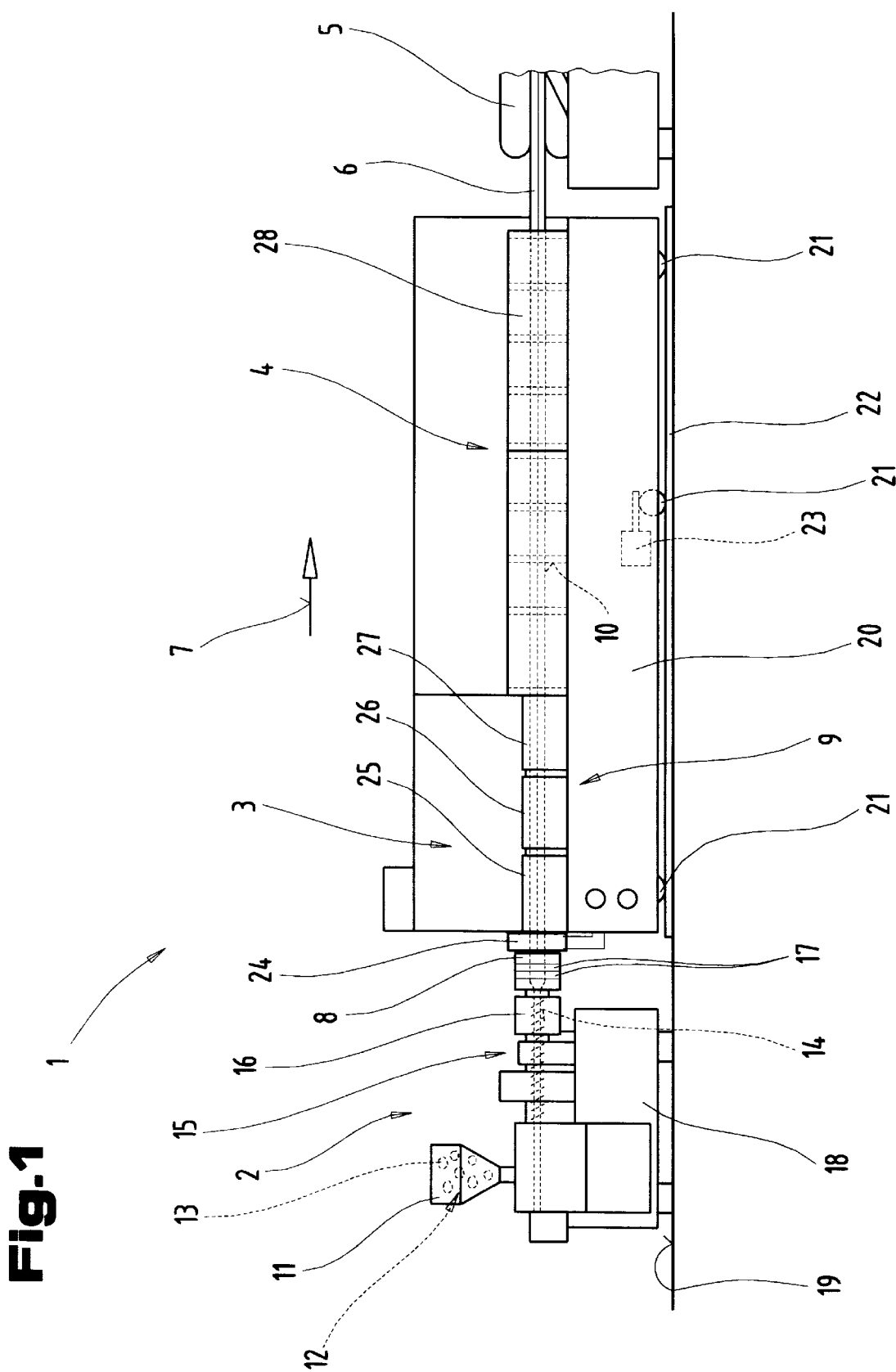
FIG. 1 shows an extrusion system having a moulding device as proposed by the invention, in a side view and shown in a simplified schematic diagram.

Firstly, it should be pointed out that the same parts common to the different embodiments described are shown by the same reference numerals or given the same component names so that the disclosures made throughout this description can be readily applied to the same parts bearing the same reference numerals or the same component names. In addition, individual features based on the different examples of embodiments may constitute solutions to the objective proposed by the invention in their own right.

FIG. 1 illustrates an extrusion system 1, consisting of an extruder 2, a moulding device 3 arranged thereafter, a cooling device 4 arranged thereafter, which may optionally also be a calibrating device, and an off-take track 5 for an extruded object 6. The purpose of the off-take track 5 is to draw the object 6, which may be a profile, for example, particularly a hollow profile having profiled sections with a hollow in the interior of the section as well as sections of solid material, consisting of plastic for window construction, from the extruder 2 in the direction of extrusion—arrow 7—through the moulding device 3 and the cooling device 4. The moulding device 3 in this example of an embodiment consists of an extrusion die 8, a calibrating device 9 and supporting orifices 10 in the cooling device 4. The supporting orifices 10, however, may also be designed as calibration orifices for the object 6 in order to provide an additional support function.

Located in the region of the extruder 2 is a supply container 11, into which a material 12, such as a plastic material 13 for example, is fed and having a screw press 14 feeding to the extruder 2. In addition, the extruder 2 also has a plasticising unit 15, by means of which the material 12, is heated and plasticised as it is fed by the screw press 14 in the direction of the extrusion die 8, and possibly also by means of optional additional heating devices 16 depending on its inherent properties, under pressure and optionally by feeding in additional heat. In front of the inlet to the extrusion die 8, the mass flow of plasticised material 12 is fed into transfer zones 17 towards the desired profile cross-section. The extrusion die 8 with the plasticising unit 15 and the supply container 11 are supported and retained on a machine bed 18, the machine bed 18 being erected on a flat stand surface 19, such as a flat span of floor.

The calibrating device 9 with the cooling device 4 arranged thereafter is disposed and retained on a calibrating table 20, the calibrating table 20 being supported on guide rollers 21 on a track 22 mounted on the stand surface 19. The purpose of mounting the calibrating table 20 by means of guide rollers 21 on the track 22 is so that the entire calibrating table 20 with the devices and appliances on it can be moved in the direction of extrusion—arrow 7—from or to the extrusion die 8. In order to make this shifting movement easier and more accurate, one of the guide rollers 21 has a travel drive 23, as illustrated schematically by broken lines, which enables a specifically controlled longitudinal movement of the calibrating table 20 to the extruder 2 or away from the extruder 2. Any solutions or components known from the prior art can be used to drive and control this travel drive 23.

The calibrating device 9 is made up of several calibrating dies 24 to 27 supported on a mounting plate arranged one after the other in the direction of extrusion—arrow 7—illustrated in simplified form, and of a vacuum calibrator design, for example, whereby the object 6 is calibrated in a known manner inside the individual moulding or calibrating dies 24 to 27. In addition, the vacuum slits, the cooling sections and the flow passages or cooling bores as well as their connections and supply may be of a design known from the prior art. This calibration may be a combination of wet and dry calibration, for example, or may be based on dry calibration only. Moreover, surrounding air is totally prevented from getting in, at least between the extrusion die 8 and the first calibrating die 24 and/or at least between the first calibrating die 24 and other calibrating dies 25 to 27. Clearly, however, it is also possible to allow air to enter as far as the object 6 or water baths, at least in certain regions, between the individual calibrating dies 24 to 27.

The cooling device 4 for the object 6 as it leaves the calibrating device 9 has at least one cooling chamber 28, formed by a housing illustrated in simplified form and which is divided into regions one immediately after the other by means of the supporting orifices 10 arranged in the interior volume of the cooling chamber 28, illustrated in simplified form. However, it is also possible to reduce the pressure prevailing in the interior of the cooling chamber 28 to a pressure below atmospheric air pressure.

After it leaves the extrusion die 8, the object 6 has a shape of cross-section determined by the extrusion die 8, which is calibrated and/or cooled accordingly in the adjoining calibrating dies 24 to 27 forming the calibrating device 9 until the tough plastic object 6 has been sufficiently cooled at the surface or peripheral regions so that its external shape and accordingly its dimensions are stable. After the calibrating device 9, the object 6 is fed through the adjoining cooling device 4 to produce additional cooling and, if necessary, calibration, thereby fixing the final shape of cross-section which the object 6 will assume.

Figure 2:
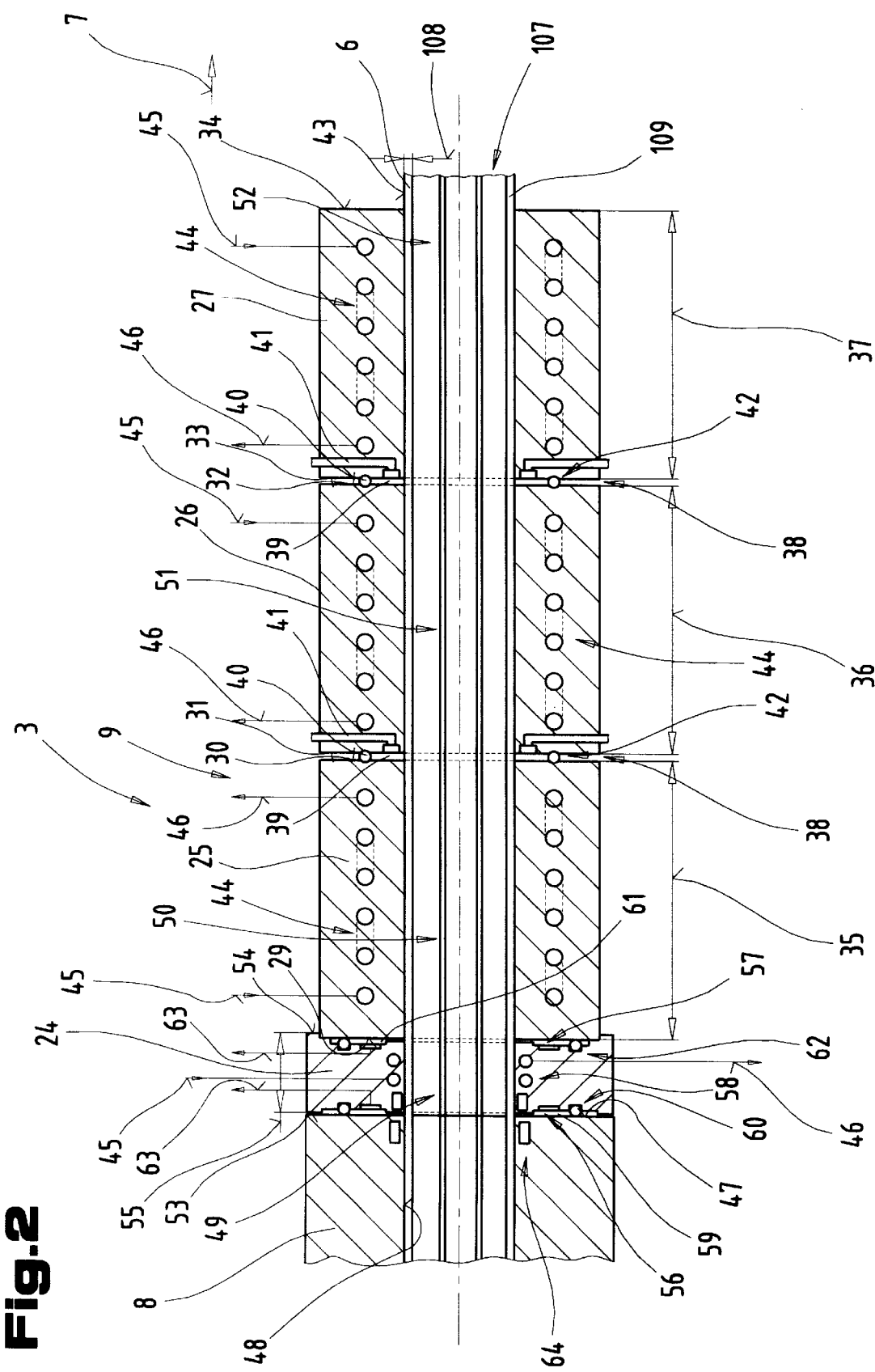
FIG. 2 shows the moulding device illustrated in FIG. 1 in a side view in section and in a simplified enlarged schematic diagram.

FIG. 2 depicts the moulding device 3 consisting of the extrusion die 8 and the calibrating device 9 from a side view in section and in an enlarged, simplified schematic form, the reference numbers being the same as those used for FIG. 1.

The calibrating device 9 of this embodiment again comprises calibrating dies 24 to 27 disposed one after another in the direction of extrusion arrow 7. The other calibrating dies 25 to 27 arranged after the first calibrating die 24 may be of a design known from the prior art in this case although the number and design used are illustrated in a simplified schematic form only and clearly these may be totally different. In the direction of extrusion—arrow 7—the other calibrating dies 25 to 27 are bordered by end faces 29 to 34 spaced apart from one another in a direction of their lengths 35 to 37. The drawing also illustrates how a gap 38 is formed between the end faces 30, 31; 32, 33 of the calibrating dies 25 to 27 facing one another, this gap 38 being of a size of between 0.5 mm and 2.0 mm. However, it would clearly also be possible to select a gap 38 size larger than 2.0 mm.

In order to prevent ambient air from getting through to the object 6 in the region of the gap 38 between the other calibrating dies 25 to 27, a respective sealing element 40 is provided, preferably designed or arranged surrounding and at a distance from the object 6. There is an additional advantage to be had if at least one of the cavities 39 is connected via a line 41, shown schematically, to a vacuum generator, not illustrated in more detail, for example a vacuum pump, in order to evacuate the cavity 39 to a negative pressure of between 0.01 bar and 0.95 bar, preferably between 0.2 bar and 0.8 bar.

Clearly, however, instead of providing at least one cavity 39 and using this design of sealing element 40, it would also be possible to dispense with the sealing device 42 and instead provide a water bath for at least one cavity 39 in a known manner in order to be able to wet an external surface 43 of the object 6 as it is transferred from one calibrating die to the next calibrating die. Of course, instead of using water, it would also be possible to use any other coolant fluid or cooling medium.

A simplified illustration is also provided to show how a cooling device 44 is provided inside each of the calibrating dies 25 to 27, used to cool the object 6 as it is fed through the calibrating dies. In this particular embodiment, this cooling device 44 is supplied with cooling medium via its own delivery line 45, which is connected to the throughput of the calibrating dies 25 to 27 and fed away by means of a discharge line 46 to a supply unit, not illustrated in detail. Also illustrated is the way in which the circulating direction of the cooling medium inside the cooling device 44 can be selected to pass between the individual calibrating dies 25 to 27 in different ways, so that circulation is possible both in the direction of extrusion—arrow 7—and in a flow direction opposite to the direction of extrusion.

Arranged between an end face 47 of the extrusion die 8 facing the calibrating device 9 and the end face 29 of the other calibrating die 25 is the first calibrating die 24, which, in this embodiment, is arranged and retained in a form fit on the next calibrating die 25 disposed immediately after it in the direction of extrusion—arrow 7. Die cavities 48 to 52 are arranged both inside the extrusion die 8 and in each of the calibrating dies 24 to 27 respectively extending in the direction of extrusion—arrow 7—designed to define the shape of the cross-section of the object 6 to be fed through and are preferably arranged centrally to or centred with respect to one another.

In the direction of extrusion—arrow 7—the first calibrating die 24 has end faces 53, 54 arranged at a distance from one another, so that a length 55 of the first calibrating die 24 is formed between them in the direction of extrusion—arrow 7. This length 55 may be between 15.0 mm and 400.0 mm, although shorter or longer lengths would clearly also be possible. In this embodiment, the calibrating die 24 is arranged in such a way that as the object 6 emerges from the extrusion die 8 and enters the calibrating die 24, a gap 56 is still maintained between the end face 47 of the extrusion die 8 and the end face of the calibrating die 24 and, after passing through the first calibrating die 24, another gap 57 is maintained between the end face 54 of the calibrating die 24 and the end face 29 of the next calibrating die 25, as it enters the latter. The first calibrating die 24 also has a cooling device 58 which will be described in more detail with reference to the subsequent drawings. Again, a cooling medium can be circulated by means of independent delivery and discharge lines 45, 46.

Also disposed between the end face 47 of the extrusion die 8 and the end face 53 of the first calibrating die 24 is a sealing device 60 to provide a seal for a cavity 59 between the latter and the external surface 43 of the object 6 against the ambient air. Additionally in this embodiment, another sealing device 62 is provided between the end face 54 of the first calibrating die 24 and the end face 29 of the next calibrating die 25, also as a means of forming another cavity 61. At least one of the two cavities, but preferably both cavities 59, 61, is connected by means of one or more lines 63 to a vacuum unit, not illustrated in detail, such as one or more vacuum pumps for example, so that the negative pressure in at least one of the two cavities 59, 61 is between 0.01 bar and 0.95 bar, but preferably between 0.2 bar and 0.8 bar. It is also advantageous if an additional tempering device 64 is provided for the extrusion die 8, in the region of the end face 47 of the extrusion die 8 and immediately adjacent to the die cavity 48 thereof, as a means of directly heating or tempering the external surface 43 of the object 6 immediately before it is discharged therefrom. A detailed description of the calibrating die 24 with its cavities 59, 61 and sealing devices 60, 62 as well as other features will be given with reference to one of the other drawings.

FIGS. 3 to 7 illustrate the calibrating die 24 with the extrusion die 8 arranged immediately before it and the other calibrating die 25 arranged immediately after it, on an enlarged scale, the same reference numerals again being used for the same parts as used in FIGS. 1 and 2.

As described above, the calibrating die 24 is disposed so that it immediately follows a gap 56 from the end face 47, the gap width 65 of the gap 56 between these being less than 1.0 mm. The die cavity 49 of the calibrating die 24 is, as can best be seen from FIG. 4, surrounded by individual die faces 66, terminal edges 67 being formed between these and the first end face 53 of the calibrating die. Other terminal edges 68 are formed between the die faces 66 and the other end face 54 of the calibrating die 24 arranged at a distance from the first end face 53. These die faces 66 enclosing the die cavity 49 are in turn divided into individual main die faces 69 and recessed and/or projecting part-die faces 70 arranged between these. Consequently, some of these individual part-die faces 70 form an inter-connecting longitudinal passage 71 for receiving a projection of the object 6 which will protrude beyond the main die faces 69 or a bead 72 or ledge extending in the direction of extrusion—arrow 7—to form a recess in the object 6 to be fed through, set back from the main die faces 69.

Arranged in the region of the extrusion die 8 before the die faces 66 of the calibrating die 24 are other die faces 73, as well as other die faces 74 arranged thereafter in at least one of the calibrating dies 25 to 27.

Figure 4:
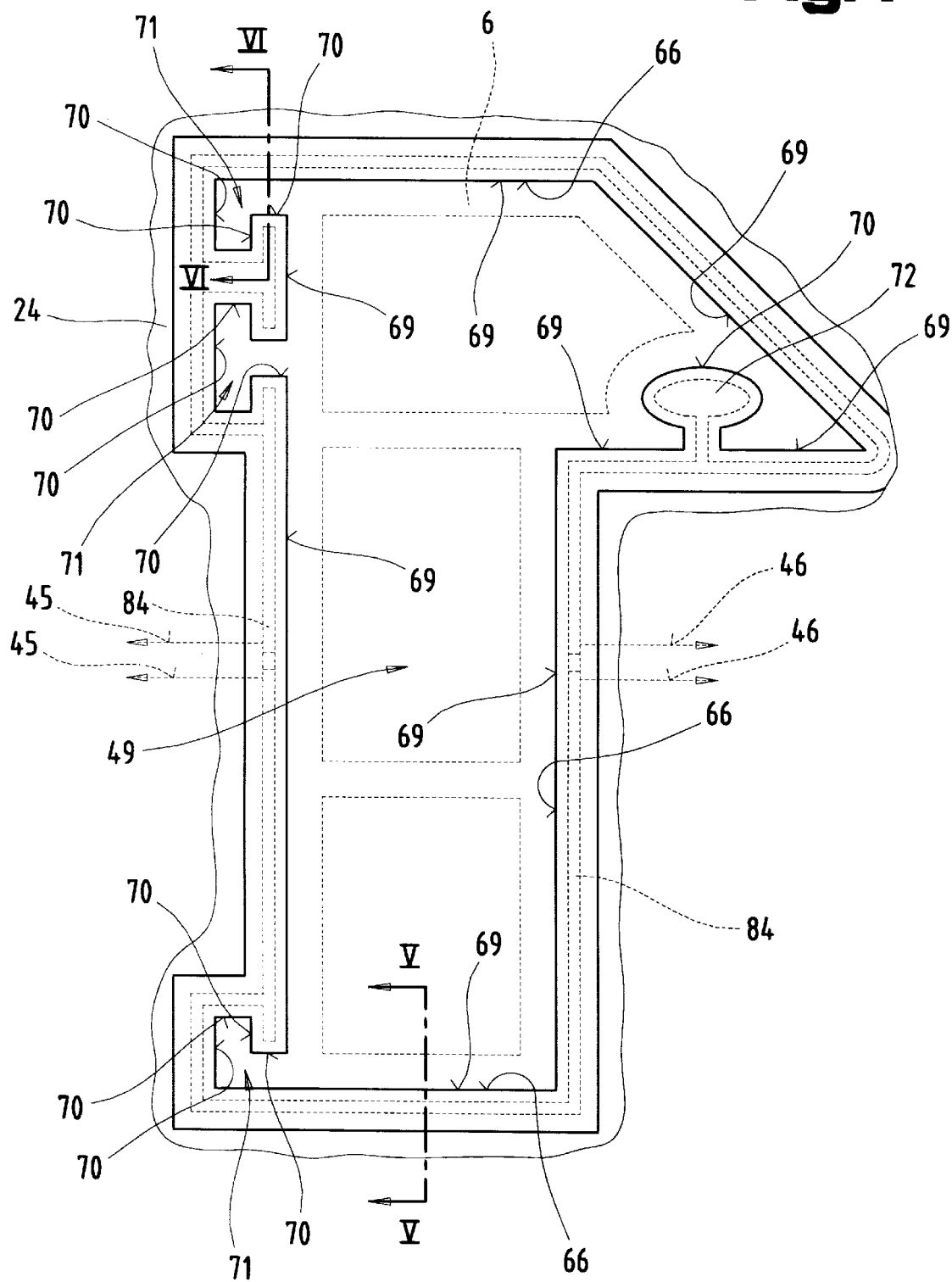
FIG. 4 shows a part of the moulding device illustrated in FIGS. 1 to 3 in a front view and in section along the lines IV—IV of FIG. 3.

The object 6 to be fed through the die cavity 49 is illustrated in FIG. 4 in a simplified schematic form by broken lines, this object being a section made from plastic, in particular a window section with several cavities, the external surface 43 of which is brought to lie against the individual main die faces 69 and part-die faces 70 immediately adjoining the inlet of the calibrating die 24. The shape of cross-section chosen for the object 6 in this instance is only one of a number of possible cross-sections and it is clear that any shape of cross-section or arrangement and design of the main die faces 69 and the part-die faces 70 relative to one another are conceivable and can be freely selected depending on the object 6 to be manufactured.

In order to set the gap width 65 of the gap 56 between the extrusion die 8 and the calibrating die 24, means are provided for forming the gap 56 between the end faces 47 and 53 facing one another, consisting in this example of an embodiment of at least one, preferably several support elements 75 arranged in the region of the end face 53. If a planar or flat design is used for the end face 47 of the extrusion die 8, the gap width 65 can be clearly set by means of the height selected for the support elements 75 relative to the end faces 67 of the calibrating die 24. In order to prevent as little heat as possible from being transmitted from the heated extrusion die 8, which may also be described as an extrusion nozzle and which is brought to a predeterminable nozzle temperature by means of heating elements, it is an advantage if the support elements 75 are designed to have as small as possible a bearing surface in order to prevent or stop heat from being conducted directly from the extrusion die 8 to the calibrating die 24 as far as possible.

In view of the narrow gap width 65 in the area of the gap 56 in the region at which the object 6 is transferred between the extrusion die 8 and the calibrating die 24, it is also an advantage if the individual die faces 66 have part-end faces 76 at least in certain regions, starting from the terminal edges 67 of the die cavity 49 of at least one of the terminal edges 67 of the die faces 66, in order to form the gap 56. The part-end faces 76 are formed by parts of the surface of the end face 53, whereby a surface extension of this part-end face 76 is made up of the circumferential length of the die faces 66 and a width 77, starting from the terminal edges 67 in the direction remote from the cavity 49. The smaller the chosen surface extension and width 77, the lower the transfer of heat will be from the extrusion die 8 to the calibrating die 24. It is also of advantage if other part regions of the surface of the end face 53 have at least one, but preferably several, recesses 78 arranged set farther back than these in order to provide as large a distance as possible between the end face 47 of the extrusion die 8 and the face of the recess 78 facing it. This will make it possible to keep the transfer of heat, in particular irradiated heat, to as low a level as possible, on the one hand to avoid unnecessarily heating the calibrating die 24 and on the other to avoid drawing off heat from the extrusion die 8 unnecessarily.

As already described above, in order to form the cavity 59, the end face 53 of the calibrating die 24 is provided with a sealing device 60, which may be of the most varied design. The sealing device 60 illustrated in this example of an embodiment is arranged at a preferably vertical distance from the die faces 66 of the calibrating die 24 and designed to be continuous as viewed around the circumference. In view of the high temperature reached by the extrusion die 8, it is also an advantage if the sealing device 60 is temperature resistant, in which case the sealing device 60 may also comprise several sealing elements 79, 80 so that the sealing element 79 lying closer to the cavity 59, for example, will be temperature resistant whilst the sealing element 80 may be of a resilient design. The two sealing elements 79, 80 will therefore be arranged one after the other in the direction of extrusion—arrow 7—and lying adjoining one another and the temperature resistant sealing element 79 will project beyond the end face 53 in the direction of the end face 47 of the extrusion die 8 thereof due to the spring or resilient action of the other sealing element 80. In order to ensure that the cavity 59 is sealed, the temperature resistant sealing element 79 is firstly laid against the end face 47 and the other sealing element 80 is elastically deformed until the support elements 75 are supported whilst forming the predefined gap 56 at the end face 47 of the extrusion die 8. The gap 56 and the cavity 59 can be evacuated by means of the line 63 illustrated in a simplified schematic form, in which case the vacuum will preferably be between 0.01 bar and 0.95 bar, preferably between 0.2 bar and 0.8 bar. As a result, the cavity 59, which is bounded by the end face 47 of the extrusion die 8, the end face 53 of the calibrating die 24 and the sealing device 60, will be sealed off from external ambient conditions on the one hand and on the other can be evacuated to a pressure slightly below the atmospheric conditions by means of connected vacuum pressure units, not shown in detail.

Arranged in the region of the other end face 54 of the calibrating die 24 between it and its other end face 29 of the calibrating die 25 is a sealing device 62 as described above, which in turn is provided as a means of forming the cavity 61. This cavity 61 is in turn connected via a line 63, illustrated in schematic form, to vacuum pressure units not illustrated in detail, so that this cavity can also be evacuated to a negative pressure of between 0.01 bar and 0.95 bar, preferably between 0.2 bar and 0.8 bar.

In order to mutually align or centre the die cavities 49, 50 and the die faces 66, 74 enclosing them, the calibrating die 24 illustrated in this example of an embodiment has a centring locator 81 in the region of the end face 54, enabling the die faces 66, 74 arranged one after the other to be accurately aligned with one another. Due to the layout of the centring locator 81, another part end face 82 of the end face 54 is arranged between a part face of the centring locator 81 facing the end face 29 recessed back therefrom in order to form the gap 57 and, because of the size of the recess between the part end face 82 and the end face 29 of the calibrating die, the gap 57 is of a size of between 0.5 mm and 2.0 mm. However, a size larger than 2.0 mm can clearly be selected for this gap 57. Due to the fact that the individual sealing devices 42, 60 and 62 are arranged between the individual end faces so as to seal off the individual cavities 39, 59, 61, the individual die faces 66, 73, 74 are arranged inside the cavity or open into it.

In order to cool the object 6 to be fed through, the calibrating die 24 is provided with the cooling device 58 described above, which is formed by means of cooling passages 83 provided in a known manner through the die faces 66. These are filled with cooling medium by means of the delivery or discharge line 45, 46. In addition to the cooling passages 83 the cooling device 58 has at least one passage 84 immediately adjacent to a die face 66 in the region of the end face 67 between the latter and the first end face 53 extending at least across a part region of a circumference of the die cavity 49 and co-operating with the calibrating die 24 to cool the outermost peripheral zone of the object being passed therethrough as a means of preventing the outermost peripheral zone or surface from sticking to the die walls 66 of the calibrating die 24. In view of the fact that the object 6 may be of the most varied shape of cross-section or cross-section dimensions, however, it is clearly also possible to arrange several of these passages 84 distributed around the circumference of the cavity 49 in the region of the first end face 53.

Figure 7:
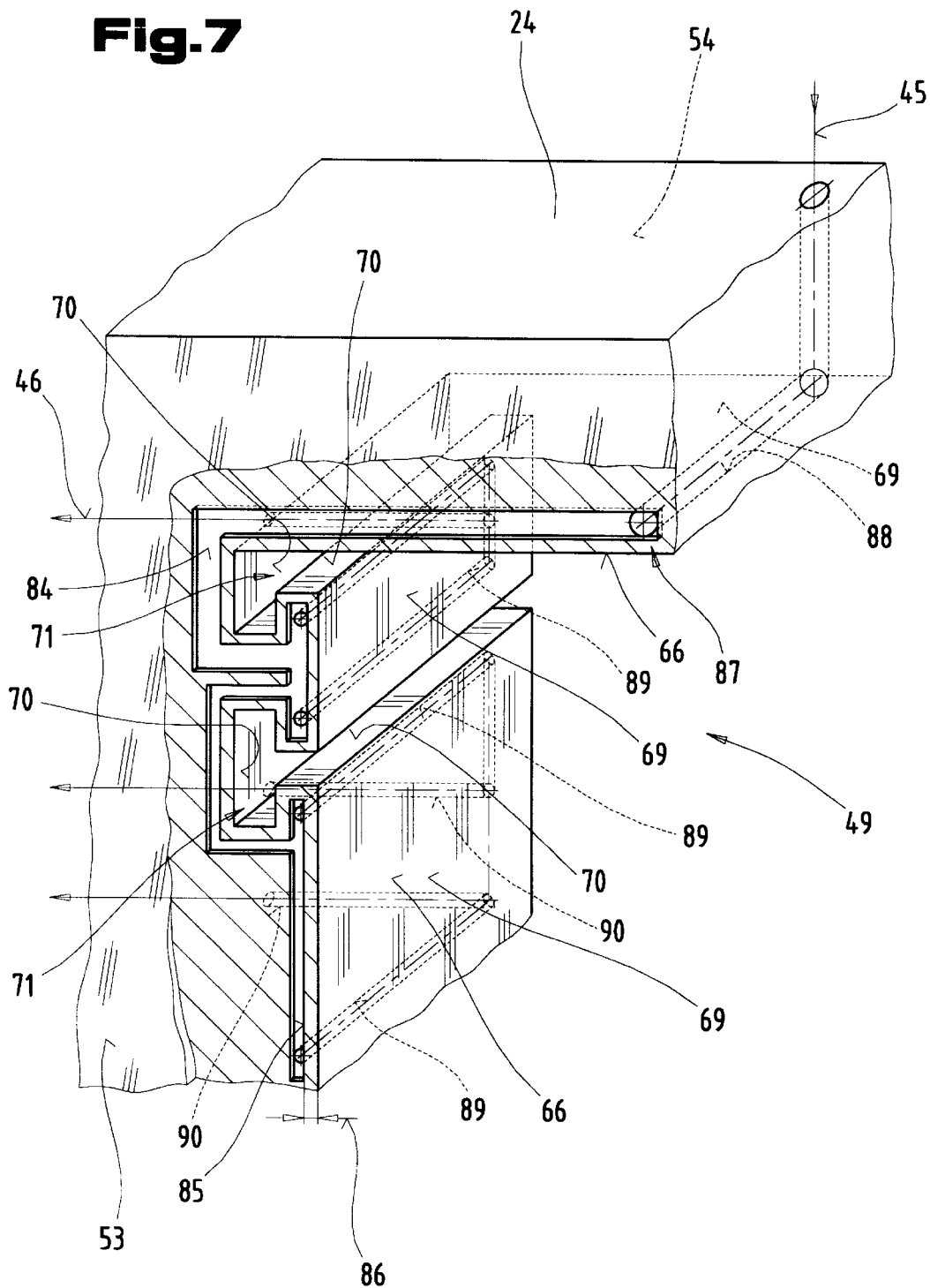
FIG. 7 shows another part-region of the moulding device with head and part-die faces in a simplified perspective view.

As can be seen more clearly from FIG. 7, the passage 84 is immediately adjacent both to the die face 66 and the part end face 76 of the end face 53. It has proved to be of advantage if a passage wall 85 of the passage 84 facing the die face 66 is arranged at a distance 86 of between 0.5 mm and 2.0 mm, preferably about 1.0 mm, from it.

In the embodiment illustrated here, in an inflow region 87—in this case shown in the right-hand part of the drawing—the passage 84 has and is connected to a delivery passage 88, this delivery passage 88 preferably being aligned parallel with both the die face 66 and parallel with the direction of extrusion—arrow 7—so that it will also provide additional cooling for the die face 66 across its longitudinal extension. Due to the fact that the passage 84 is arranged close to the surface relative to the die faces 66, it runs close to the contour of the section so that depending on the layout and the length of the passage 84 as viewed across the cross-section of the cavity 49, additional and rapid cooling is provided in the region of the terminal edge 67 at the outermost surface layers of the object. The passage 84 of the main die face 69 is arranged starting from the inflow region 87 and surrounds the longitudinal passage 71 bounded by the part die faces 79 to form a connection so that, in the region between the main die faces 69 and the part-die faces 70 starting from the passage 84, at least one flow passage 89 is provided extending from the first end face 53 in the direction of the other end face 54 of the calibrating die 24, through which a part-flow of the cooling medium fed through from the passage 84 will provide additional cooling for the surface region between the main die faces 69 and the part-die faces 70 in a longitudinal direction. Consequently, a certain amount of heat is drawn off from the object 6 in these regions as it passes through the calibrating die 24 to allow correct cooling.

Along the other longitudinal run of the passage 84 in a circumferential direction of the die cavity 49, other flow passages 89 are provided between the main die faces 69 and the part-die faces 70, the number and layout of these flow passages provided as branches off from this passage 84 being dependent on the shape of the cross-section of the extruded object 6. By preference, these flow passages 89 are also aligned parallel with both the die faces 66 and the main die faces 69 and part-die faces 70 forming them and parallel with the direction of extrusion—arrow 7.

At least one discharge passage 90 is provided for each of the individual flow passages 89 in the region of the other end face 54, the discharge passages 90 being assigned to flow passages 89 so as to fit in with their layout depending on the geometrical shape of the object 6. For example, several flow passages 89 can be connected to a common discharge passage 90, in order to provide a common discharge line for the circulating medium. Clearly, however, it would also be possible for the delivery passage 88 also to be arranged in the transfer region between a main die face 69 and at least one part-die face 70. In order to produce uniform flow conditions or an even throughput of the cooling medium through the passage 84 using the preferably multiple arrangement of flow passages 89 provided across the longitudinal path of the passage 84, the cross-section along the longitudinal run of passage 84 as viewed round the circumference of the die cavity 49 can be adjusted and reduced accordingly in terms of dimensions and with it the possible throughput quantity as a ratio of the cross-section dimensions of the flow passages 89 co-operating therewith. This will guarantee a uniform throughput of coolant medium both in the passage 84 and in the flow passages 89 co-operating therewith.

By means of this immediately adjacent layout of the passage 84, those surface areas of the die faces 66 in the region of the passage 84 will be brought to a temperature of between −20° C. and +70° C., preferably between 0° C. and +50° C., thereby producing a more intensive transfer of heat and cooling at the outermost peripheral zone of the object 6 being fed through. The cooling medium circulated through the passages 84 is fed via delivery lines 45 and discharge lines 46, illustrated in a simplified form, to and from the calibrating die 24 and processed in a device or system not illustrated in detail, e.g. cleaned, cooled and re-circulated or partially or completely replaced by fresh cooling medium. The cooling medium may be selected from a most varied range and will depend on the desired temperature to be produced at the die faces 66 in the region from which the object 6 is fed into the calibrating die 24.

Figure 3:
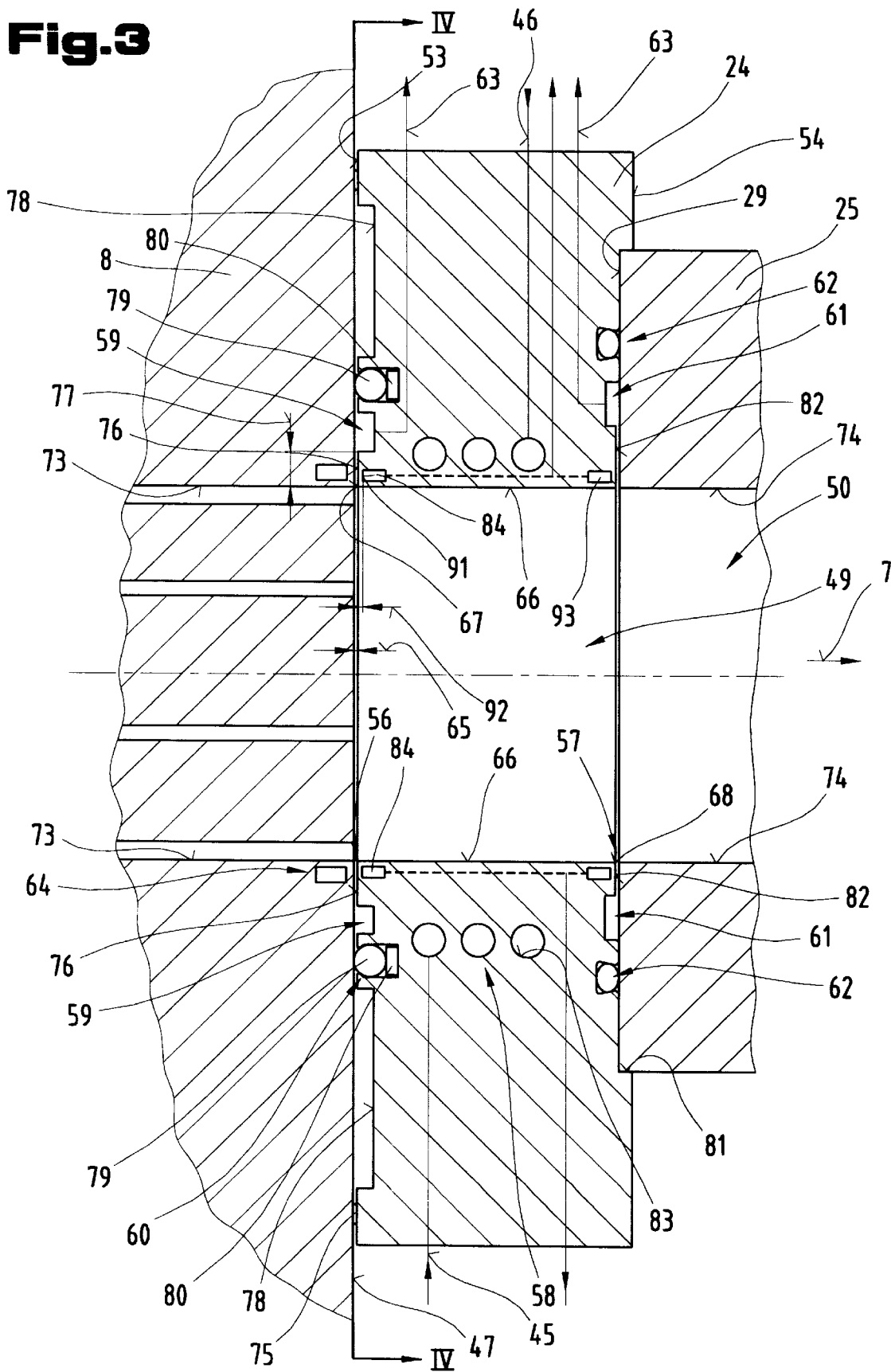
FIG. 3 shows a part of the moulding device illustrated in FIGS. 1 and 2 in a side view in section and in a simplified enlarged schematic diagram.

As illustrated in the case of the passage 84 shown in FIG. 3, a passage wall 91 of the passage 84 facing the end wall 53 is arranged at a distance 92 apart of between 0.2 mm and 2.0 mm, but preferably less than 1.0 mm, which means that it is possible to draw off a high amount of heat rapidly and specifically directed at the object 6 to be fed through, immediately at the inlet region to the calibrating die 24, which will be sufficient to prevent the outermost peripheral zone from adhering to the die walls 66. Due to the arrangement of the passage 84 close to the surface in the region of the first end face 53, a certain amount of heat is drawn off from the extrusion die 8 in the outlet region for the object 6, in which case there is an advantage because this loss of heat can be compensated by means of the tempering device 64 mentioned above, for example in the form of a heating element co-operating with the die faces 73 of the extrusion die 8. This produces active insulation between the two end faces 47 and 53 facing one another directly at the region in which the object 6 is transferred between the oppositely facing die faces 73 and 66 of the extrusion die 8 and the calibrating die 24.

Irrespective of the above, however, it is also possible to provide, in addition to the passage 84 arranged in the region of the other end face 54, another, directly adjacent passage 83 in the region of the other end face 54 of the calibrating die 24, at least across a part section of the circumference of the die cavity 49, as illustrated in simplified schematic form in FIG. 3. The passage 93 can be supplied with cooling medium both independently, in other words separately from passage 84, and of course in conjunction with it within the calibrating die 24.

Clearly, however, it would also be possible to use a multiple layout of the calibrating die 24 to form the calibrating device 9 but in this case it would also be possible, regardless of the above, to use the individual parts or components described in respect of the calibrating die 24 for the other calibrating dies 25 to 27 and arrange them accordingly. It would also be possible to arrange the calibrating die 24 after an extrusion die 8 without forming the cavity 59 and without keeping to the gap width 65 of the gap 56 and expose the object 6 to the external ambient conditions as it leaves the extrusion die 8 in the transfer region between it and the calibrating die 24. The layout and design described for the other cavities between the calibrating dies 24 to 27 need not necessarily be as described here and may of course be freely selected between the individual calibrating dies 24 to 27.

Figure 5:
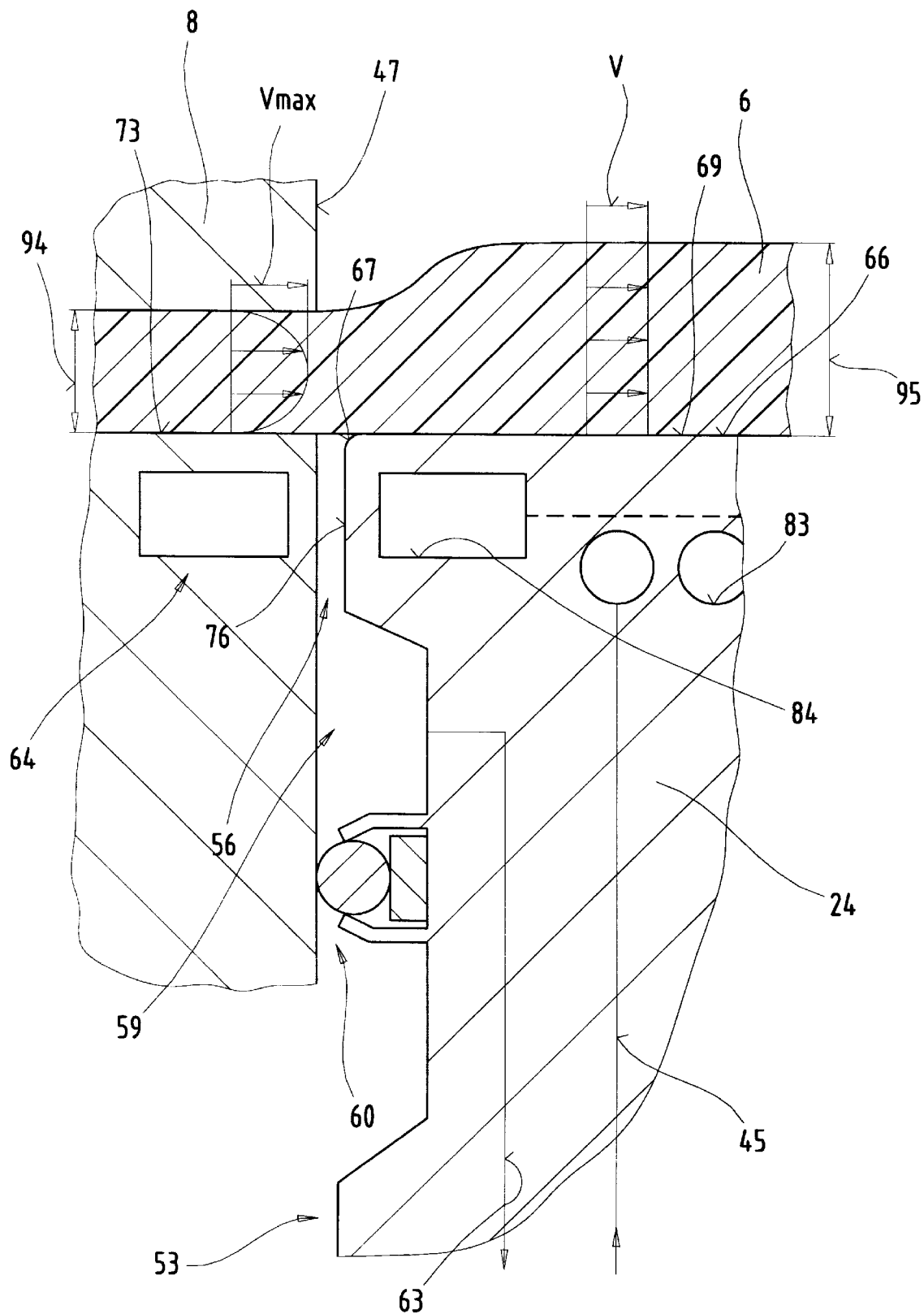
FIG. 5 shows a part of the moulding device in the region of the transfer between the extrusion die and the calibrating die in a side view, in section along the lines V—V of FIG. 4 and in an enlarged schematic diagram.

FIG. 5 depicts a part region of the extrusion die 8 and calibrating die 24 in the immediate transfer region of the object 6 in a simplified schematic diagram and on an enlarged scale. The plastic material prepared and plasticised by the extruder is discharged by means of and between the die faces 73 of the extrusion die 8, which causes the shape of the cross-section of the desired object 6 to set. Depending on the nozzle geometry and the inherent properties of the material used, the velocity of the through-flowing material is distributed in the region of the die faces 73, as schematically illustrated in diagram form, in a part region of a profiled section of the object 6. As a result of adhesion, the peripheral region of the through-flowing plastic material almost comes to a standstill in the region of the die faces 73 and reaches a highest velocity more or less at the centre thereof, producing an approximately parabolic flow path. Immediately adjoining the outlet in the region of the end face 47, the velocity of the individual part flows is balanced until a same relative flow rate or outflow rate is restored. As a result of this balancing of the flow rates, an acceleration occurs at the peripheral regions and a slowing down at the centre region, which generates a swelling effect in the plastic material. This swelling effect is crucial to the wall thickness of the object 6 to be obtained and will depend on an initial thickness 94 of the plastic material in the region of the extrusion die 8 and a final thickness 95 after the object 6 has been subjected to the swelling effect, calibrated and cooled. This swelling can only be produced with profiled sections in which there is a hollow compartment in the interior of the object that is not subject to calibration and can therefore allow for some give in the material in the direction of the cavity.

Due to the immediate sequential arrangement of the calibrating die 24 and the rapid cooling of the outer part flows of the object 6, the initial thickness 94 for a desired final thickness 95 of about 3.0 mm, for example, may be about 2.2 mm or less. Starting from the initial thickness 94, this corresponds to a swelling factor of approximately 36%. This swelling effect can be increased still further by producing a back-up effect in the region of the calibrating die 24 and selecting the initial thickness 94 accordingly.

In systems known from the prior art, the gap between oppositely facing end faces 47 and 53 is selected so as to be greater than 1.0 mm, preferably between 10.0 mm and 50.0 mm, which means that a swelling effect of only approximately 15% can be achieved starting with an initial thickness 94 of 2.6 mm, for example, producing a final thickness 95 of 3.0 mm.

This enhanced swelling effect in the plastic material described above is achieved due to the negative pressure on the external face of the section and the ambient pressure on the internal face of the section as well as the small distance between extrusion die 8 and calibrating die 24. Furthermore, this swelling of the material will also depend on the material selected, the nozzle geometry and the memory effect of the material during the preparatory phase thereof inside the extruder 2 through to the nozzle outlet.

One crucial criterion in manufacturing sections, particularly those used for constructing windows, is that of the heat storage test, in which, prior to the start of the test a section to be tested is marked up with a fixed measured length of 200 mm, after which the section is maintained at a temperature of 100° C. for a period of one hour and then cooled to room temperature. Once completely cooled, the permissible shrinkage of the previously measured length is a maximum of 2%. With the known moulding devices, because of the high tensile forces inherent in the calibration and cooling processes, this low shrinkage value can only be maintained within certain limits, which means that the object 6 has to be cooled in a certain pre-stretched position and this pre-stretched position and the internal tensions inherent therein are released during the heat storage test, allowing the object 6 to shrink accordingly.

By contrast, the method proposed by the invention using the moulding device 3 and calibrating device 9 proposed by the invention in a totally unpredictable way produces a situation in which part flows extend in individual profiled sections of the object 6, specifically those co-operating with the die faces 66 of the calibrating device 9 and the moulding device 3 immediately adjoining the nozzles, possibly due to an offset between the die faces 66, 73, as well as in the calibrating device 9 and in the extrusion die 8, and are frozen or fixed by means of the direct cooling system in this stretched pre-stressed position against the cavity of the object 6. Simultaneously, however, those part flows in the profiled sections of the object 6 which co-operate with the cavity thereof are held back due to the differences in flow rate produced by the fact that the surface area of the cross-section of the continuous gap through the extrusion die is reduced whilst the quantity conveyed remains the same. This difference in flow rate occurs due to the fact that the average throughput rate of the part flows in the extrusion die 8 and that in the calibrating device 9 and moulding device 3 connected thereafter differ from one another by approximately 25–40%, preferably 28–35% so that the average flow rate in the extrusion die 8 is higher by this amount. As a result of this back-up effect, the shrinkage behaviour of the plastic material is reduced in these part flows, which means that the tensions generated by the shrinkage, tending to cause a convex deformation in the part flows facing the die faces, produced during expansion and freezing of these part flows, are substantially eliminated against the pre-stress directed into the cavity.

As a result, the tension in the section is compensated in a surprisingly simple manner without the need for subsequent heat treatment, since the shrinkage tensions which occur due to the effect of cooling applied at points laterally offset from one another in the direction of extrusion—arrow 7—at different times are automatically eliminated at the end of the calibrating device 9 and moulding device 3, thereby avoiding subsequent shrinkage or a difference in tension once the objects 6 are completely finished.

In this connection, there is a practical advantage to be had if a flow rate difference between the part flows sliding along the die faces 73 of the extrusion die 8 and the part flows passing through the central region of the die passages of the extrusion die 8 is 10% greater, preferably 20% greater.

Figure 6:
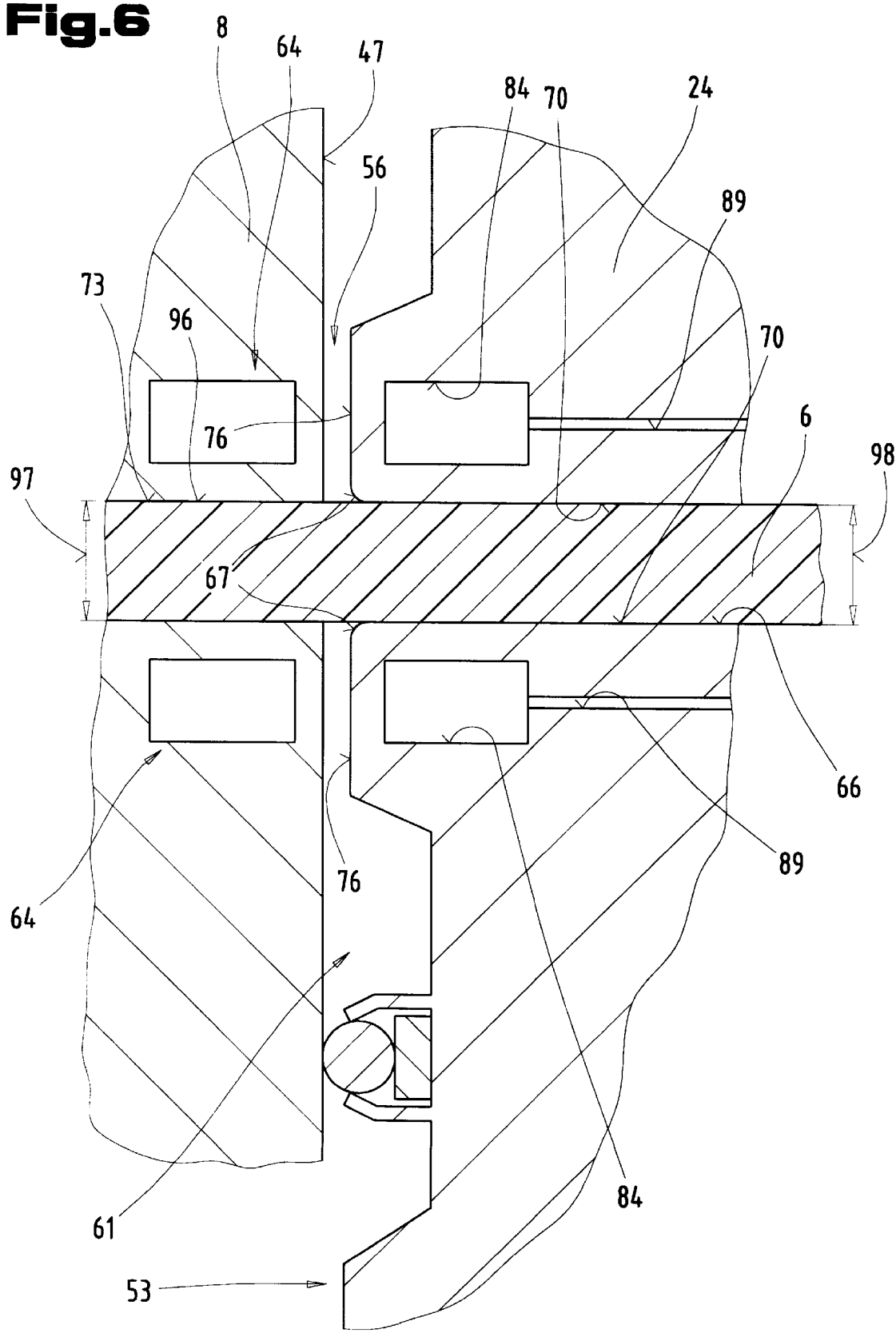
FIG. 6 shows another part-region of the moulding device in the region at which the object is transferred from the extrusion die to the calibrating die in a side view, in section along the lines VI—VI and in an enlarged schematic diagram.

FIG. 6 illustrates another part region of the object 6 in the region of the die faces 66, in particular the part die faces 70, in a schematic and enlarged form. These profiled sections of the object 6 are solid profiled sections, which means that they do not have any cavity on the interior and therefore can not be affected by the ambient pressure.

In the profiled sections illustrated here, in the region of the part die faces 70, the nozzle pressure is not sufficient to force the plastic material through without applying a drawing force through the calibration system. In the region illustrated here, considerably more material could be discharged from the extrusion die 8 than can be applied by the calibration tool 24 to the region of the part-die faces 70, which leads to a back-up in the extrusion die 8. This back-up is promoted by the immediate sequential arrangement of the calibrating die 24 in conjunction with the negative pressure in the cavity 61 and the small size of the gap 56. Arranged in front of the part die faces 70 of the calibrating die 24 are other part-die faces 96 in the extrusion die 8 for forming these solid profiled sections, these part-die faces 96 for forming an output thickness 97 of a given size being arranged at a certain distance from one another. The part-die faces 70 of the calibrating die 24 are spaced at a distance from one another in order to produce a final thickness 98 of the solid profiled sections which contain solid material on both sides, the final thickness 98 being at least the same size but preferably greater than the initial thickness 97. In view of the fact that the part-die faces 70 are arranged on all sides in the calibrating die 24, these solid profiled sections are guaranteed to be of a solid design. In addition, because of this layout in conjunction with the swelling effect illustrated in FIG. 5 and described above, an even distribution of material is promoted across the cross-section between the solid profiled sections and the hollow profiled sections of the object 6.

Figure 8:
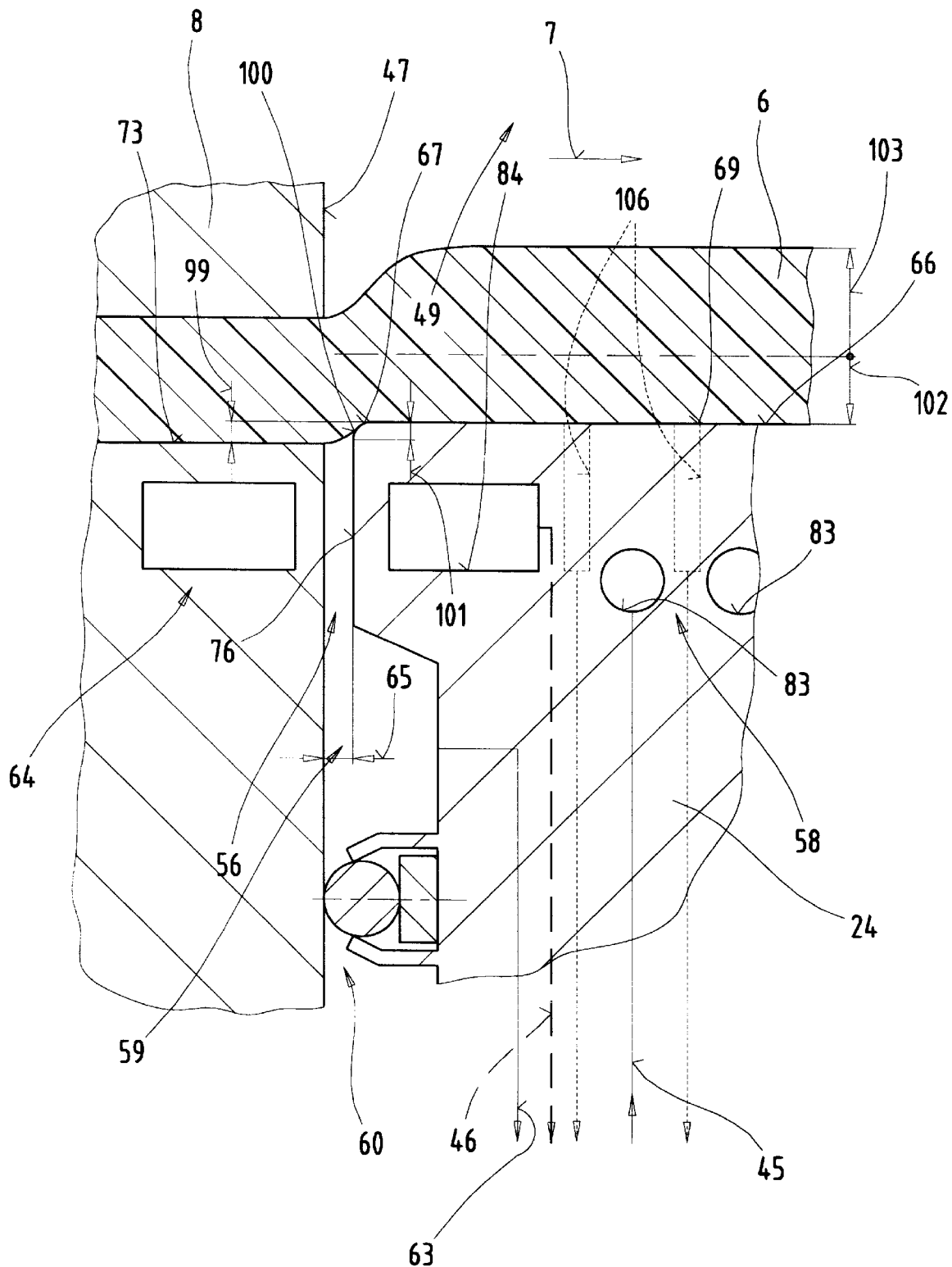
FIG. 8 shows another and, optionally, independent embodiment of the moulding device having die faces offset from one another in the region where the object is transferred between the extrusion die and the calibrating die, in a side view in section and in a simplified, enlarged view.

FIG. 8 illustrates another possible and optionally independent layout of the die faces 66, in particular the main die faces 69, relative to the die faces 73 of the extrusion die 8 arranged before them, the same reference numerals being used for the same parts as those used in relation to FIGS. 1 to 7. In order to avoid unnecessary repetition, individual parts having the same components or the same reference numerals as those shown in the other drawings or described above will not be described again.

The gap 56 in the region of the part end faces 76 having a gap width 65 of less than 1.0 mm is formed in a manner similar to that described in relation to the embodiments illustrated in FIGS. 1 to 7. The same applies to the way in which the cavity 59, the sealing device 60, 62, the cooling device 58, in particular the passage 84, 93, and the tempering device 64 are formed.

In the embodiment illustrated here, at least some of the individual die faces 66, particularly some of the individual main die faces 69, of the first calibrating die 24 are offset from the die faces 73 arranged in front of them and co-operating therewith in the extrusion die by a distance 99 of between 0.001 mm and 0.7 mm, preferably between 0.05 mm and 0.4 mm, for example, in the direction of a centre of the die cavity 49 of the calibrating die. As a result of this offset arrangement of the two die faces 66, 73 relative to one another, the terminal edge 67 projects between the die face 66 and the part end face 76 in a direction of the flow cross-section of the object and it is therefore advantageous to provide a transition surface 100, at least in the region of individual terminal edges 67 between the die faces 66 and the main die faces 69, and the first end face 53 and part end faces 76 of the calibrating die 24, in order to form a sharp-edged projection. This transition surface 100 may be of any shape and may be flat, for example, and/or curved, in particular as a radius. Between a starting point of the transition surface in the region of the end face 53 and part end face 76 of the calibrating die 24 and the die face 66 and main die face 69, a height 101 is formed in a direction perpendicular to the direction of extrusion—arrow 7—and to the die face 66, which is selected so that it corresponds at least to the distance 99 of the die faces 66, 73 offset relative to one another between the extrusion die 8 and the calibrating die 24.

In the calibrating devices and methods known to date, because of the extraction force applied to the object 6 by means of the off-take track, the object is stretched in its longitudinal extension and it is in this position that the external peripheral zones are calibrated during passage through the calibrating device 9 and cooled. Other part regions of the cross-section in the direction of the cavity of the section are not cooled until later because of the cooling process and therefore undergo a process of shrinking which means that the completely cooled section is subjected to inner tensile stress as a result of the shrinking process in the interior part region of the cross-section but this can no longer be dissipated by the peripheral zones which have already been cooled in the calibrating device 9. These high inner tensile stresses can cause the surfaces of the object 6 to assume a waved effect, which becomes visible if producing a high grade of gloss.

As a result of this offset layout of the die faces 66, 73 relative to one another and because the calibrating die 24 is arranged immediately thereafter with the gap 56 designed to have a very small width, a negative pressure being applied to the cavity 59, there is a certain degree of back-up effect in the plasticised plastic material as it is discharged at the transfer from the extrusion die 8 to the calibrating die 24, as described above. Because of the additional feature of off-setting the die faces 66, 73 relative to one another, the schematically illustrated peripheral region 102 of the object 6 expands in individual profiled sections thereof to a greater degree than the other inner regions 103, where there is a back-up effect during the extrusion process. With the ensuing cooling process and the shrinking process which this involves in the interior region 103, the peripheral region 102 can be subjected to the back-up effect subsequently without causing waving transversely to the direction of extrusion—arrow 7—on the surface of the object 6.

The most varied of influencing factors such as cooling, composition of material and the memory effect of the plastic material which occurs in the material during the prior processing or treatment starting from the extruder through to the nozzle outlet are decisive in producing a high degree of gloss on the surface of the object 6. If cooling is only slight or poor within the calibration system, the plasticised material continues to adhere to at least certain regions of the die faces 66 of the calibrating die 24, which leads to differences in velocity in the cross-section of the section. This also has a detrimental effect on the mechanical properties, shrinkage values, the gloss obtained, etc. To avoid these disadvantages, it is critical that cooling should start to occur immediately the plasticised object enters the calibrating die 24, which will have a positive effect on the degree of gloss, the mechanical properties, the dimensional stability and the shrinkage behaviour of the object 6. In addition, less machining will be required subsequently, particularly as regards the solid profiled sections of the object 6, in the region of the part-die faces 70, during this part of the processing. It is these solid profiled sections which are commonly used for functional and connection purposes, which means that a high dimensional stability is required of these parts of the sections.

As a result of the layout or design of the calibrating die 24, it is possible to maintain the requisite mechanical properties, shrinkage values and degree of surface gloss virtually irrespective of the mixture of plastic material used and the various additives and more or less regardless of fluctuations in the mixing ratio from one batch to another. In addition, with a moulding device 3 of this type, the same moulding device 3 can be used in conjunction with different extruders and types of extruder. Conforming to the requisite shrinkage behaviour is also facilitated because the back-up effect which occurs earlier prevents the extraction force from causing excessive stretching of the section. The gloss and formation of a uniform surface are also guaranteed, a gloss grade of 80% being possible, for example, compared with the gloss levels of 30% produced to date. This gloss grade will depend on the fillers added to the plastics material before the extrusion process.

Figure 9:
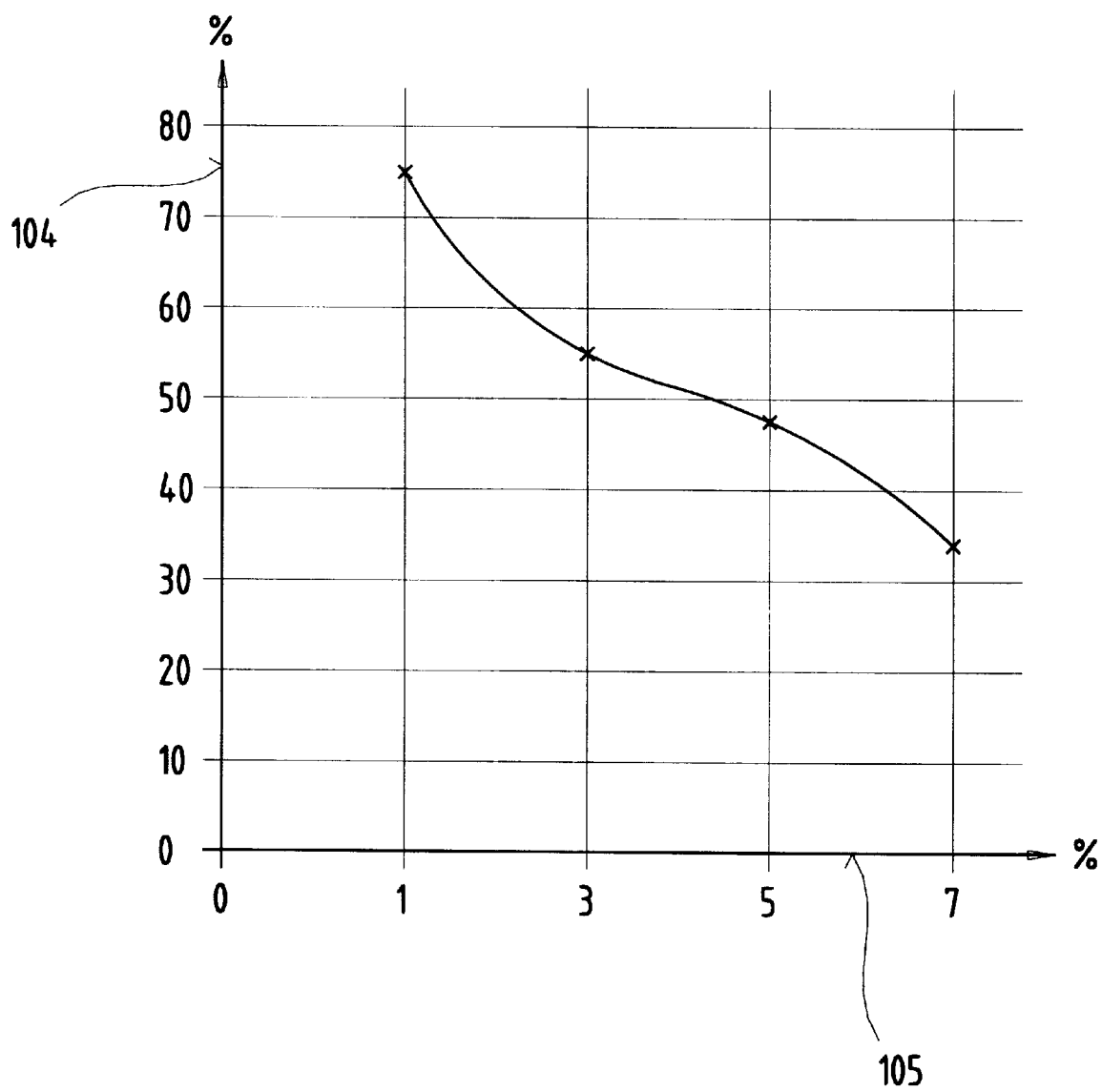
FIG. 9 shows a diagram showing the gloss that can be obtained on the surface of the object depending on the raw material and added chalk used.

FIG. 9 illustrates how the degree of gloss is dependent on the fillers used, in particular chalk. The degree of gloss as a percentage is plotted on the ordinate 104 whilst the addition of chalk as a percentage by weight relative to the total mixture is plotted on the abscissa 105. From this it is clear that the higher proportion of chalk used, the lower the degree of gloss as a percentage. It is quite commonplace to use a high proportion of fillers to plastic material as a cost-saving measure, in order to keep the price of the raw materials used for such mixtures to a minimum. The fact that the degree of gloss is detrimentally affected by these admixtures can be overcome by arranging the calibrating die 24 immediately adjoining the extrusion die 8, which will produce a significant improvement or enhancement and will do so regardless of the mixture of plastic or of the additives and agents, which may be of the most varied type.

FIG. 8 provides a further illustration of how at least some of the individual die faces 66 have across the longitudinal extension thereof in the direction of extrusion—arrow 7—at least one but preferably several slit-shaped orifices 106 perpendicular to the die faces 66. These slit-shaped orifices 106 are preferably designed as vacuum slits and a negative pressure can also be applied to them via independent lines thereof, illustrated schematically, connecting them to a vacuum pressure unit. This layout of the slit-shaped orifices 106 across the longitudinal extension of the individual die faces 66 is optional and not compulsory. However, it is preferable if the individual die faces 66 are designed so as to be continuously open across the longitudinal direction thereof in the direction of extrusion—arrow 7—in other words without interruption.

The softened and plasticised plastic material drawn out from the extruder 2 is subjected to a lower pressure than the external ambient pressure immediately at its outer surface 43 after the outlet from the extrusion die 8 and the external surface 43 of the object 6 is then subjected to enhanced cooling in an inlet region to the calibrating die 24, which ensures that the external surface 43 is prevented from sticking to the die faces 66 of the calibrating die 24. At the same time as the object 6 is transferred from the extrusion die 8 to the calibrating die 24, the cooling process across the wall thickness of the object 6 at individual profiled sections of the object 6 in the direction of extrusion—arrow 7—gives rise to a reciprocal shifting of individual part flows into these profiled sections, balancing the flow rate prevailing in all the part flows into these profiled sections, which means that these individual profiled sections exhibit a uniform flow velocity relative to one another across the thickness of the wall.

In addition, as they enter the first calibrating die 24, individual part flows in the region of the external surface 43 of individual profiled sections can be cooled by means of the die faces 66, 73 of the extrusion die 8 and the calibrating die 24 in an extended position as compared with the other part flows of the same profiled sections in a longitudinal direction of the object 6 and the shrinking process balanced by the simultaneous backing-up process of the other part flows in the region of the cavity of the object 6. Consequently, internal longitudinal stress is largely avoided so that improved shrinkage values can be achieved during the heat storage test, as described above. This offset position of the individual die faces 66, 73 of the calibrating die 24 and of the extrusion die 8 in a direction perpendicular to the surface 43 may be of a size between 0.001 mm and 0.7 mm, for example, preferably between 0.005 mm and 0.4 mm.

It should also be pointed out that the object 6 has cavities 107—as can be seen from FIG. 3—and the mass of plasticised plastic material emerging from the extrusion die can be balanced 8 across a wall thickness 108 from external walls 109 of the object 6. As explained above, it is through the quantities of plasticised plastic material fed into the solid profiled sections that the velocity at which the plasticised plastic material already forming the object 6 at this point is fed through the calibrating die 24. In view of a longer production time, the volumes of plasticised plastic material dependent on this velocity and required to make the external walls 109 of the object 6 will now mean that a wall thickness 108 can be varied within low limits, i.e. if larger volumes of the plasticised plastic material of the object 6 are used the wall thickness 108 can be made thicker by the calibrating device 9 whereas it can be made thinner with smaller volumes of the plasticised plastic material. Since there is no calibration or setting of the wall thickness 108, it will affect neither the production run nor the required minimum size of the wall thickness 108.

It has proved to be of particular advantage if, for practical purposes, the flow resistance, e.g. the average flow resistance, through the die cavity 48 of the extrusion die is greater for those part flows of the individual profiled section of the object 6 which are formed by the main die faces 69 in the subsequently arranged calibrating device 9 than a preferably average flow resistance in the die cavity 48 for those part flows of the profiled sections of the object 6 which co-operate with the part-die faces 70 in the subsequent calibrating die 24 and accordingly form the so-called solid profiled sections. These solid profiled sections, which are usually calibrated from all sides, are assembled relative to one another so that they will receive matching elements, for example glass supports, seal supports or will be used as stops as is common in the case of windows and doors.

In order to produce the back-up effect described above primarily in the solid profiled sections, the preferably average flow resistances of the part flows co-operating with the main die faces 69 of the calibrating device 9 and those of the part flows co-operating with the part-die faces 70 in the calibrating device 9 should, for practical purposes, be the same between the inlet to the extrusion die 8 and the outlet from the calibrating device 9.

This being the case, one particularly practical design is one in which the part flows opposed by a lower flow resistance in the die cavity 48 of the extrusion die 8 are applied across a larger region of their circumference against part and main die faces 70, 69 in the calibrating device 9 than those part flows opposed by a higher flow resistance as they pass through the extrusion die 8.

Finally, in order to balance the differing volumes of plasticised plastic material moving in the direction of extrusion—arrow 7—it is also possible to apply the part flows of the section cross-section facing the die faces 73 to the main die faces 69 of the calibrating device 9 at only a part region of that cross-section of the die cavity 48 in the extrusion die 8.

Clearly, the individual embodiments described above and the variants of these embodiments illustrated here and different designs can all be used independently to attain the objective proposed by the invention or used in conjunction with one another in any combination. This applies preferably to the layout of the calibrating die 24 in conjunction with the extrusion die 8 as well as the individual calibrating dies 24 to 27 relative to one another.

Above all, the individual embodiments illustrated in FIGS. 1; 2 to 7; 8;9 may be regarded independently as attaining the objective set by the invention. The specific objectives and solutions set by the invention can be taken from the detailed descriptions of these drawings.

What is claimed is:

1. A molding device comprising an extrusion die and a calibrating device following the extrusion die in a direction of extrusion, the calibrating device comprising at least one calibrating die including a first calibrating die, the first calibrating die having a first end face and a second end face spaced therefrom in the direction of extrusion, and die faces extending between the end faces and terminating in terminal edges at the first end face, the die faces defining a die cavity for receiving an object to be extruded; a sealing device surrounding portions of the first end face extending from the terminal edges and a cavity being formed between the sealing device, an end face of the extrusion die and the first end face portions; means for forming a gap having a gap width of less than 1.0 mm between the first end face portions and the end face of the extrusion die; and a cooling device having a cooling passage immediately adjacent the terminal edges, the die faces and the first end face portions, the cooling passage extending over at least a part of the circumference of the die cavity for cooling a peripheral zone of the object and thereby to prevent adhesion thereof to the die faces.

2. The molding device of claim 1, wherein the cooling passage has a wall arranged at a distance of between 0.5 mm and 2.0 mm from the die faces.

3. The molding device of claim 1, wherein the cooling passage has a wall arranged at a distance of between 0.5 mm and 2.0 mm from the first end face portions.

4. The molding device of claim 1, wherein the cooling device has another cooling passage immediately adjacent the die faces near the second end face of the first calibrating die.

5. The molding device of claim 4, wherein the other cooling passage is connected to a discharge passage extending parallel to the second end face.

6. The molding device of claim 1, wherein the cooling device has a delivery passage for feeding a cooling medium to an inlet of the cooling passage, the delivery passage extending parallel to one of the die faces and the direction of extrusion.

7. The molding device of claim 1, wherein the cooling passage has at least one flow passage extending parallel to one of the die faces and the direction of extrusion.

8. The molding device of claim 7, wherein a portion of the one die face is recessed, the one die face lying on one side of the flow passage and the recessed die face portion lying on a side opposite to the one side.

9. The molding device of claim 1, wherein the cooling passage has a plurality of flow passages between an inlet of the cooling passage and an outlet thereof, successive ones of the flow passages having cross sections reduced in diameter from the inlet to the outlet.

10. The molding device of claim 1, wherein at least one of the die faces has at least one portion recessed or protruding therefrom.

11. The molding device of claim 1, further comprising means for evacuating the cavity formed between the sealing device and the first end face portions.

12. The molding device of claim 1, wherein the sealing device comprises a sealing element which is of a temperature resistant material.

13. The molding device of claim 12, wherein the sealing device comprises a second sealing element which is of a resilient material, the sealing element of a temperature resistant material being positioned closer to the cavity formed between the sealing device and the first end face portions.

14. The molding device of claim 1, further comprising transition faces between the terminal edges and the first end face portions.

15. The molding device of claim 14, wherein the transition faces are convex, having a constant radius.

16. The molding device of claim 1, wherein the means for forming the gap comprises a support element supporting the first calibrating die and arranged between the end face of the extrusion die and the first end face of the first calibrating die.

17. The molding device of claim 1, wherein the extrusion die has die faces aligned with the die faces of the first calibrating die, further comprising a tempering device arranged adjacent the die faces of the extrusion die and the end face thereof, the tempering device and the cooling device forming an active insulation between the end face of the extrusion device and the first end face of the first calibrating device.

18. The molding device of claim 17, wherein the tempering device has a temperature which is higher than the operating temperature of the extrusion die.

19. The molding device of claim 1, wherein the extrusion die has die faces aligned with the die faces of the first calibrating die, the die faces of the first calibrating die being offset from the aligned die faces of the extrusion die towards the center of the die cavity by 0.001 mm to 0.7 mm.

20. The molding device of claim 1, wherein the calibrating device further comprises a succession of additional calibrating dies arranged in the direction of extrusion, the additional calibrating dies having facing end faces defining a gap therebetween and die faces extending between the facing end faces, the facing end faces further forming an evacuated cavity therebetween, the gap and the cavity surrounding the die faces, and a sealing device between the facing end faces surrounding the cavity.

21. The molding device of claim 20, wherein the gap between the facing end faces is between 0.5 mm and 2.0 mm.

22. The molding device of claim 20, wherein the first calibrating die is mounted on a first one of the additional calibrating dies in the direction of extrusion in a form fit.

* * * * *